United States Patent
Birindelli

(10) Patent No.: US 9,332,728 B1
(45) Date of Patent: May 10, 2016

(54) ANIMAL CHAIR PERCH

(71) Applicant: Stacy Birindelli, McCleary, WA (US)

(72) Inventor: Stacy Birindelli, McCleary, WA (US)

(*) Notice: Subject to any disclaimer, the term of this patent is extended or adjusted under 35 U.S.C. 154(b) by 83 days.

(21) Appl. No.: 14/272,301

(22) Filed: May 7, 2014

(51) Int. Cl.
- A01K 29/00 (2006.01)
- A01K 1/035 (2006.01)
- A47C 7/62 (2006.01)

(52) U.S. Cl.
CPC .............. *A01K 1/0353* (2013.01); *A47C 7/62* (2013.01)

(58) Field of Classification Search
CPC ............................ A01K 1/0353; A01K 1/035
USPC ............................................ 108/47; 119/28.5
See application file for complete search history.

(56) References Cited

U.S. PATENT DOCUMENTS

| | | | | |
|---|---|---|---|---|
| 1,417,325 A * | 5/1922 | Hopp | G09F 3/20 | 24/457 |
| 1,843,391 A * | 2/1932 | Gayle | B60N 3/007 | 108/11 |
| 1,912,514 A * | 6/1933 | Curtis | B60R 7/043 | 119/28.5 |
| 2,045,965 A * | 6/1936 | Rosen | A47K 1/02 | 108/42 |
| 2,499,103 A | 2/1950 | Love | | |
| 2,647,716 A * | 8/1953 | Hudziak | A47C 7/68 | 108/43 |
| 3,185,113 A * | 5/1965 | Nathan | A47C 7/68 | 108/18 |
| 3,269,555 A * | 8/1966 | Henderson | B60N 3/08 | 108/47 |
| 3,295,470 A * | 1/1967 | Johnson | A47K 3/004 | 108/47 |
| 3,465,930 A | 9/1969 | Croix | | |
| 4,640,045 A * | 2/1987 | Nesbitt | A01G 9/04 | 47/39 |
| 4,698,936 A * | 10/1987 | Helfman | A01G 9/02 | 47/40 |
| 5,072,542 A * | 12/1991 | Quackenbush | A01G 9/02 | 220/23.4 |
| 5,351,648 A * | 10/1994 | Elesh | A01K 1/035 | 119/28.5 |
| 5,909,922 A * | 6/1999 | Dugas | A47C 7/70 | 108/43 |
| 6,220,557 B1 * | 4/2001 | Ziaylek | A62C 13/78 | 248/154 |
| 6,678,975 B1 * | 1/2004 | Renosky | G09F 19/00 | 40/124.5 |
| 6,688,040 B1 * | 2/2004 | Yang | A01G 5/04 | 47/41.1 |
| D516,633 S * | 3/2006 | Kosir | D20/44 | |
| 7,316,089 B2 * | 1/2008 | Brinkman | G09F 3/204 | 40/343 |
| 7,533,618 B2 * | 5/2009 | Thomason | A47B 7/00 | 108/42 |
| 7,669,556 B2 * | 3/2010 | Reusche | A01K 1/035 | 119/484 |
| 7,886,693 B1 | 2/2011 | Salzman et al. | | |
| 8,523,118 B2 * | 9/2013 | Weder | A01G 5/04 | 248/151 |
| 2012/0246906 A1 * | 10/2012 | Weder | A01G 5/04 | 29/428 |

* cited by examiner

*Primary Examiner* — Kristen C Hayes
(74) *Attorney, Agent, or Firm* — Crossley & Stevenson IP Law

(57) ABSTRACT

An animal chair perch including a perch having a top side, a bottom side, a right side and a left side. A first receiving bracket is disposed on the bottom side of the perch proximal the right side. An identical second receiving bracket is disposed on the bottom side of the perch proximal the left side. The second receiving bracket is in a position parallel to the first receiving bracket. A first support clamp and an identical second support clamp having a closed top end, an open bottom end, a first leg and a second leg. Each leg is disposed between the top and bottom ends. Each of the first and second support clamp top ends sldingly engage the respective first and second receiving bracket. Each leg securingly removably engages a chair back.

10 Claims, 3 Drawing Sheets

ANIMAL CHAIR PERCH

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of pet perches are known in the prior art. However, what is needed is an animal chair perch that slidingly removably engages a chair back. Many pets, especially cats love to be close to their owners. Many times, the owner will spend ample time sitting in a chair completing work. The cat typically wants to be near their owner as the owner works. The present invention provides an area for the cat to rest, allowing the animal to be close to the owner and also preventing the animal from disrupting the work the owner has.

FIELD OF THE INVENTION

The present invention relates to pet perches, and more particularly, to an animal chair perch which attaches to the back of a chair providing a resting area for animals.

SUMMARY OF THE INVENTION

The general purpose of the present animal chair perch, described subsequently in greater detail, is to provide an animal chair perch which has many novel features that result in an animal chair perch which is not anticipated, rendered obvious, suggested, or even implied by prior art, either alone or in combination thereof.

To accomplish this, the present animal chair perch includes a parallelepiped padded perch having a top side, a bottom side, a right side and a left side.

A first receiving bracket is disposed on the bottom side of the perch proximal the right side. An identical second receiving bracket is disposed on the bottom side of the perch proximal the left side. The second receiving bracket is in a position parallel to the first receiving bracket.

There is a first support clamp and an identical second support clamp. Each of the first and second support clamps has a closed top end, an open bottom end, a first leg and a second leg. Each leg is disposed between the top and bottom ends. The first leg is disposed in a position parallel to the second leg. Each of the first and second support clamp top ends sldingly engage each of the respective open ends of the respective first and second receiving brackets. Each of the first and second support clamps first and second legs securingly removably engages a chair back.

Each of the first and second receiving brackets has a bottom end, an open end and a closed end. Each of the closed ends are proximal the respective right and left side. Each of the closed ends prevents the complete passage of each respective top end therethrough.

Each open end of each the first and second receiving bracket has a lip disposed between the bottom side of the perch and the bottom end. Each lip prevents the undesired disengagement of each respective support clamp top ends.

Thus has been broadly outlined the more important features of the present animal chair perch so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
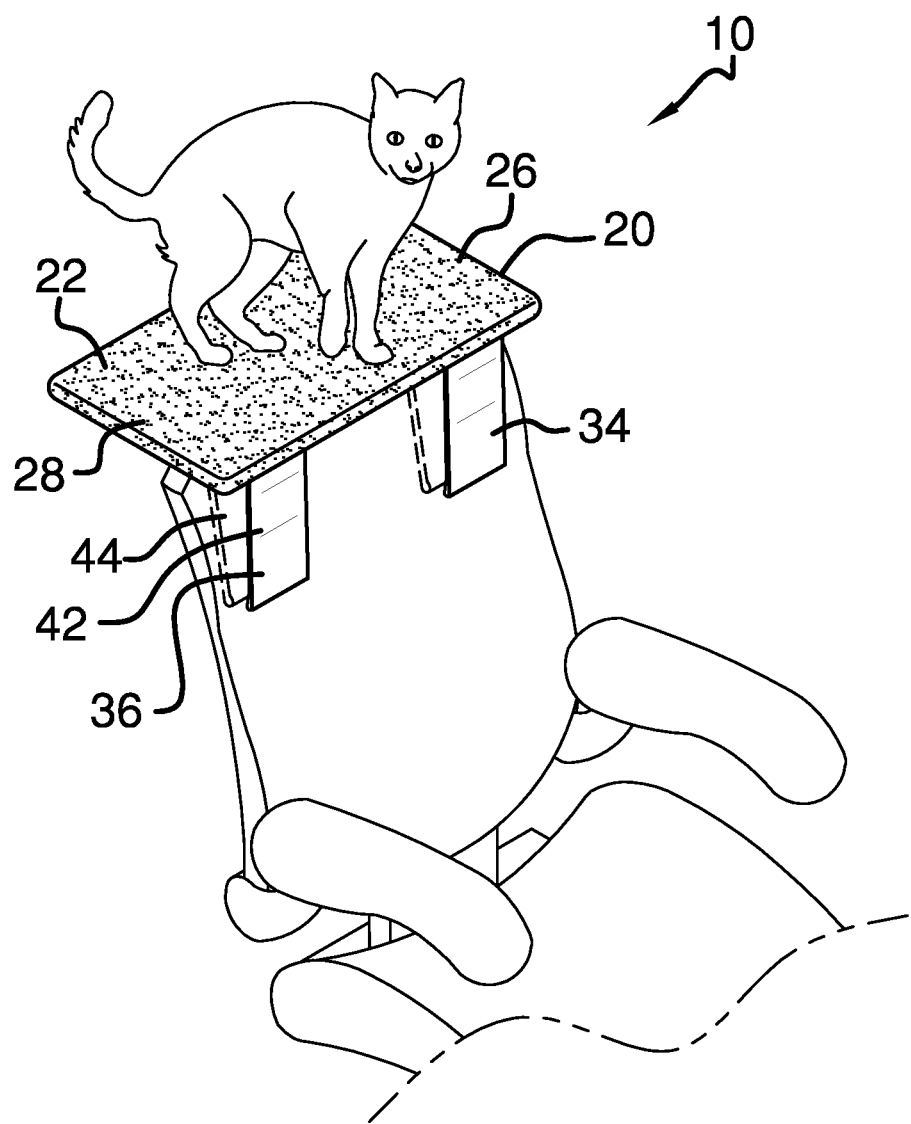
FIG. 1 is an in-use view.
Figure 2:
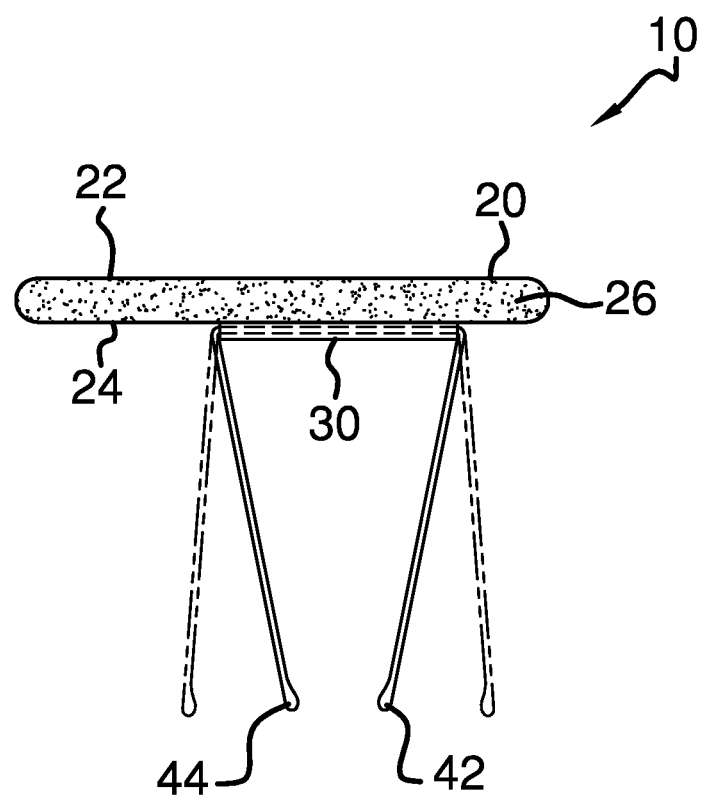
FIG. 2 is a side view.

With reference now to the drawings, and in particular FIGS. 1 through 4 thereof, an example of the instant animal chair perch employing the principles and concepts of the present animal chair perch and generally designated by the reference number 10 will be described.

Referring to FIGS. 1 through 4 the present animal chair perch 10 is illustrated. The animal chair perch 10 includes a parallelepiped padded perch 20 having a top side 22, a bottom side 24, a right side 26 and a left side 28.

Figure 3:
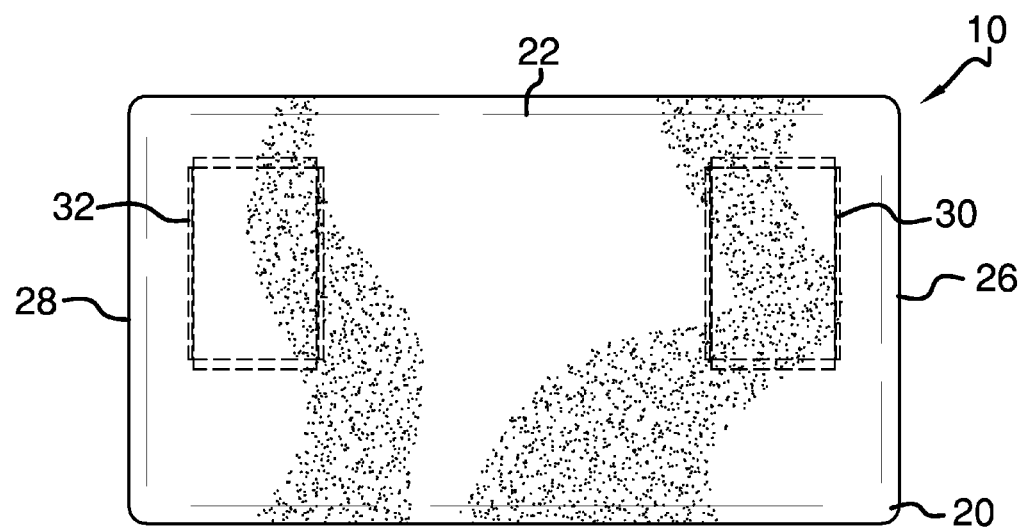
FIG. 3 is a top view.
Figure 4:
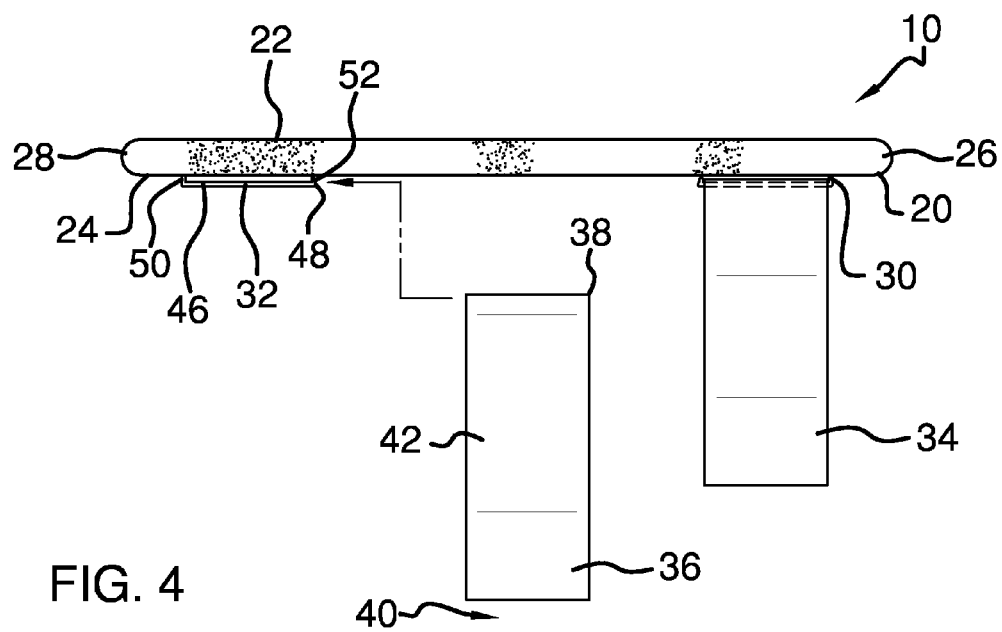
FIG. 4 is a front view.

A first receiving bracket 30 is disposed on the bottom side 24 of the perch 20 proximal the right side 26. An identical second receiving bracket 32 is disposed on the bottom side 24 of the perch 20 proximal the left side 28. The second receiving bracket 32 is in a position parallel to the first receiving bracket 30. As best shown in FIG. 3, a length of each of the first receiving bracket and the second receiving bracket is substantially one-half of a width of the perch.

There is a U-shaped first support clamp 34 and an identical U-shaped second support clamp 36. Each of the first and second support clamps 34, 36 has a closed top end 28, an open bottom end 40, a linear first leg 42 and an identical linear second leg 44. Each of the first and second leg 42, 44 is disposed between the each of the top and bottom ends 38, 40. The first leg 42 is disposed in a position parallel to the second leg 44. Each of the first and second support clamp 24,36 top end 38 sldingly engages each of the respective bottom end 40 of the respective first and second receiving brackets 30, 32. Each of the first and second support clamps 34, 36 first and second leg 42, 44 securingly removably engages a chair back.

Each of the first and second receiving brackets 30, 32 has a bottom edge 46, an open edge 48 and a closed edge 50. Each of the closed edges 50 are proximal the respective right and left sides 26, 28. Each of the closed edges 50 prevents the complete passage of each respective top end 38 therethrough.

Each open edge 48 of each the first and second receiving bracket 30, 32 has a lip 52 disposed between the bottom side 24 of the perch 20 and the bottom edge 46. Each lip 52 prevents the undesired disengagement of each respective first and second support clamp 34,36 top ends 38.

What is claimed is:
1. An animal chair perch comprising:
a perch having a top side, a bottom side, a right side and a left side;
a first receiving bracket disposed on the bottom side proximal the right side;

a second receiving bracket disposed on the bottom side proximal the left side, wherein a length of each of the first receiving bracket and the second receiving bracket is substantially one-half of a width of the perch;

the second receiving bracket in a position parallel to the first receiving bracket;

wherein each of the first and second receiving brackets have a bottom edge, an open edge and a closed edge, wherein each of the closed edges are proximal the respective right and left side;

a U-shaped first support clamp;

a U-shaped second support clamp;

wherein each of the first and second support clamps has a closed top end, an open bottom end, a linear first leg and a linear second leg, each leg disposed between the top and bottom ends, the first leg disposed in a position parallel to the second leg;

wherein each of the first and second support clamp top ends slidingly engage each of the open ends of the first and second receiving brackets;

wherein each of the first and second support brackets first and second legs is configured to securingly removable engage a chair back;

wherein the each of the closed edge are configured to prevent the complete passage of each of the top ends.

2. The animal chair perch of claim 1 wherein each open edge of each the first and second receiving bracket has a lip disposed between the bottom side of the perch and the bottom edge, each lip is configured to prevent the undesired disengagement of each respective support clamp top ends.

3. The animal chair perch of claim 2 wherein each support clamp first and second legs are in a range of five to eight inches in length.

4. The animal chair perch of claim 2 wherein each support clamp first and second legs have a width in a range between seven inches and thirteen inches.

5. The animal chair perch of claim 2 wherein the perch has a thickness in a range of two to six inches and a width in a range of eight to twelve inches.

6. The animal perch of claim 2 wherein the perch is padded.

7. An animal chair perch comprising:

a parallelepiped padded perch having a top side, a bottom side, a right side and a left side, a first receiving bracket disposed on the bottom side proximal the right side, a second receiving bracket disposed on the bottom side proximal the left side, the second receiving bracket in a position parallel to the first receiving bracket, wherein a length of each of the first receiving bracket and the second receiving bracket is substantially one-half of a width of the perch;

wherein each of the first and second receiving brackets has a bottom edge, an open edge and a closed edge, wherein each of the closed edges are proximal the respective right and left side;

a first U-shaped support clamp;

a second U-shaped support clamp;

wherein each of the first and second support clamps have a closed top end, an open bottom end, a linear first leg and a linear second leg, each leg disposed between the top and bottom ends, the first leg disposed in a position parallel to the second leg;

wherein each of the first and second support clamp top ends slidingly engage each of the open edges of the first and second receiving brackets;

wherein each of the first and second support brackets first and second legs is configured to securingly removable engage a chair back;

wherein the each of the closed edges are configured to prevent the complete passage of each of the top ends;

wherein each open edge of each the first and second receiving bracket has a lip disposed between the bottom side of the perch and the bottom edge, each lip is configured to prevent the undesired disengagement of each respective support clamp top ends.

8. The animal chair perch of claim 7 wherein each support clamp first and second legs are in a range of five to eight inches in length.

9. The animal chair perch of claim 8 wherein each support clamp first and second legs have a width in a range between seven inches and thirteen inches.

10. The animal chair perch of claim 9 wherein the perch has a thickness in a range of two to six inches and a width in a range of eight to twelve inches.

\* \* \* \* \*